March 12, 1957 A. V. RAND ET AL 2,784,663
ELECTRIC COOKING APPLIANCE
Filed July 5, 1952 3 Sheets-Sheet 1
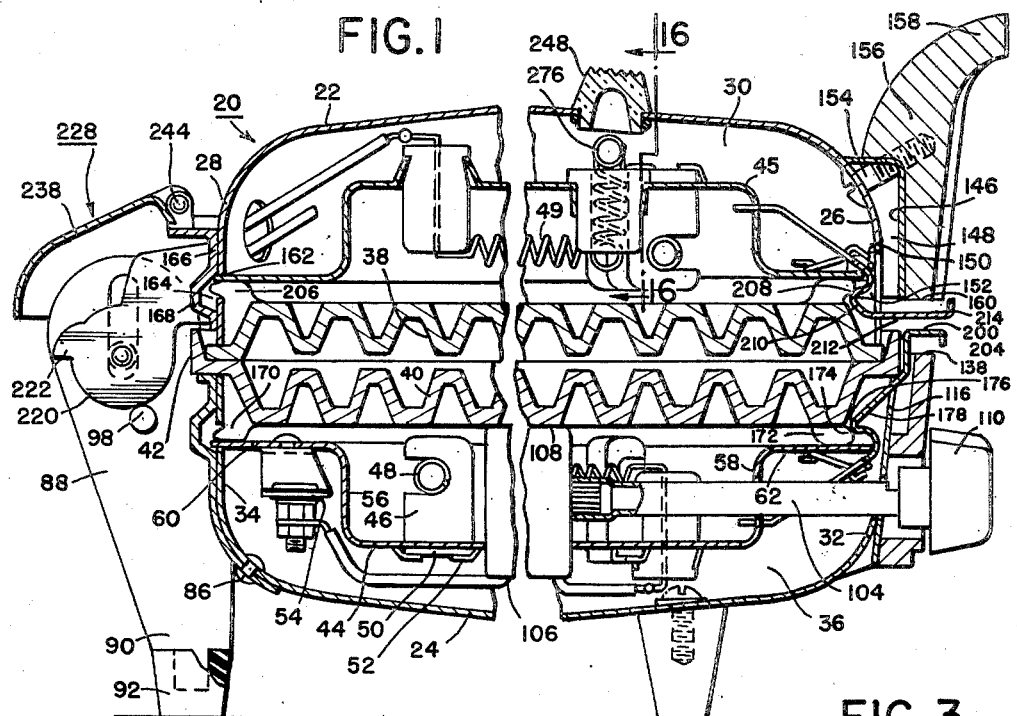
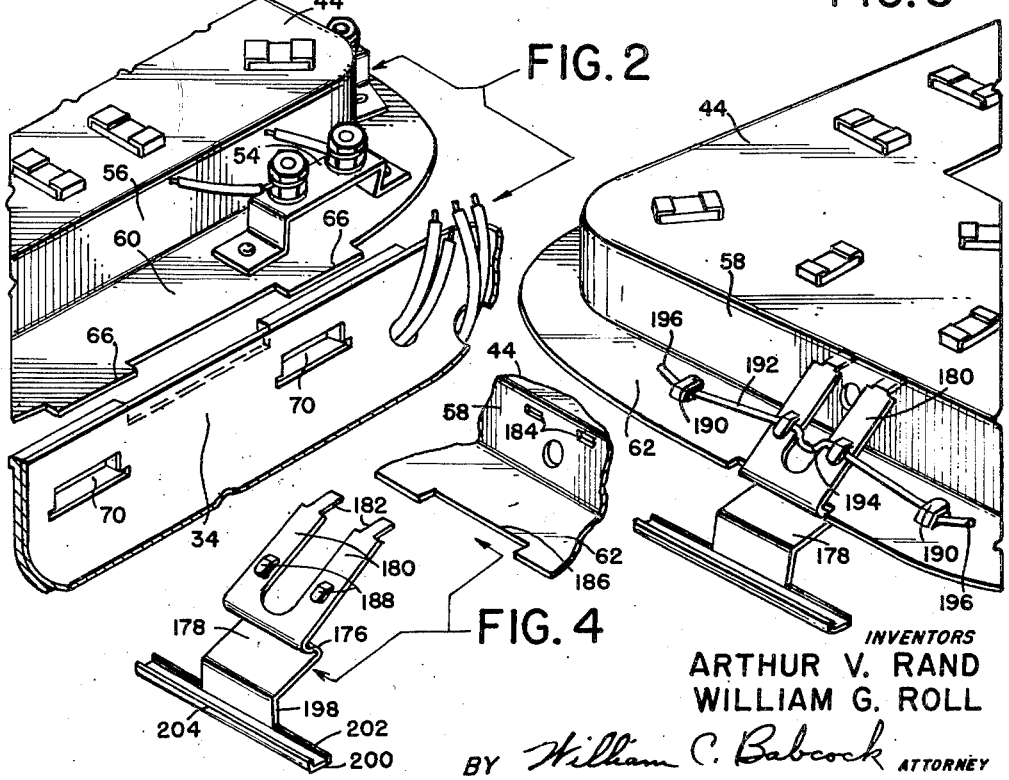
INVENTORS
ARTHUR V. RAND
WILLIAM G. ROLL
BY William C. Babcock ATTORNEY March 12, 1957  A. V. RAND ET AL  2,784,663
ELECTRIC COOKING APPLIANCE
Filed July 5, 1952  3 Sheets-Sheet 2
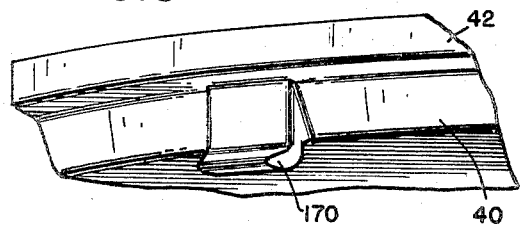
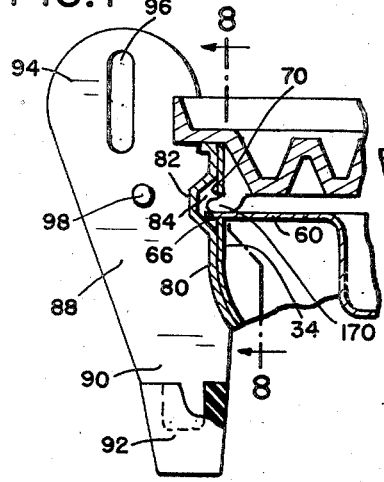
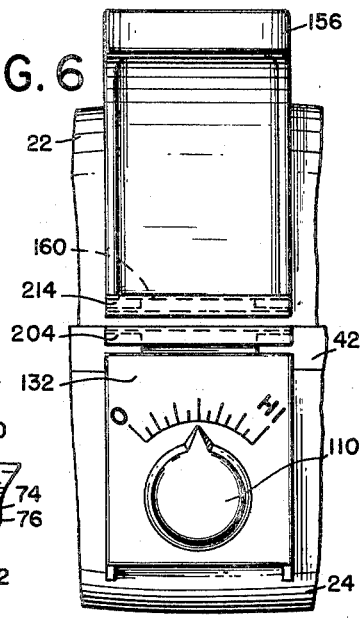
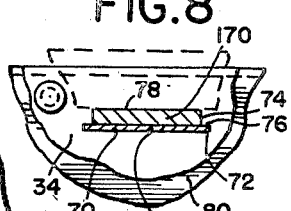
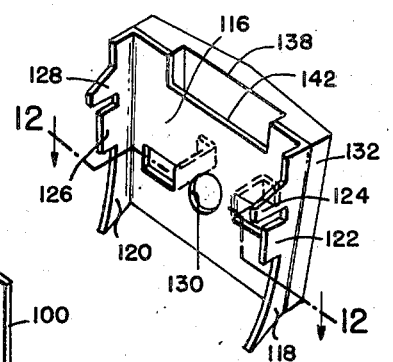
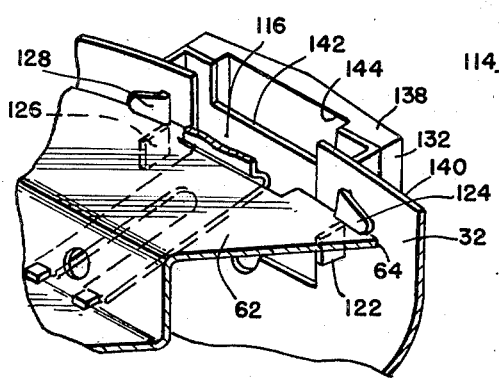
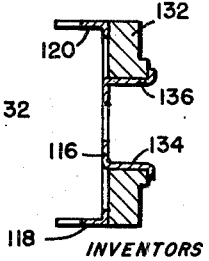
INVENTORS
ARTHUR V. RAND
WILLIAM G. ROLL
BY William C. Babcock ATTORNEY

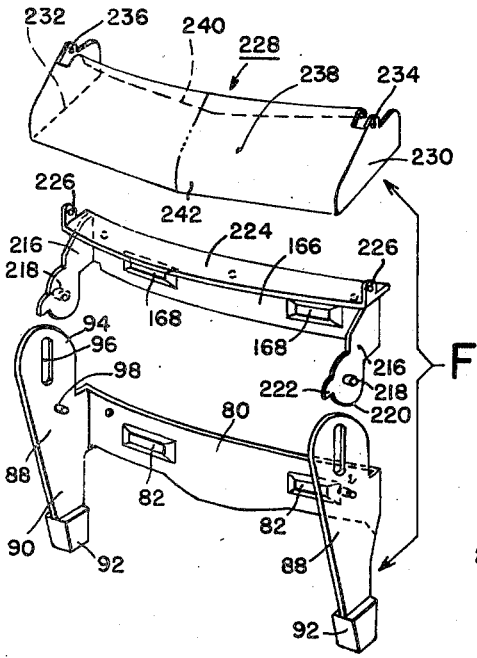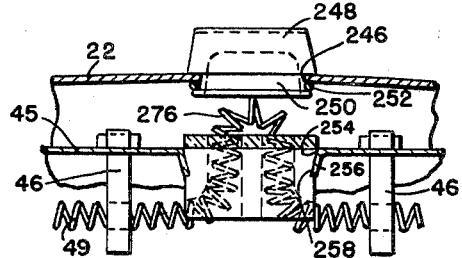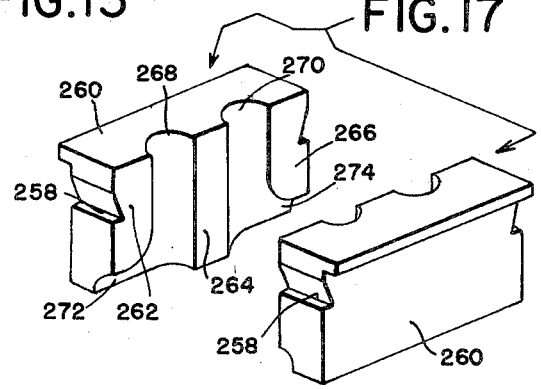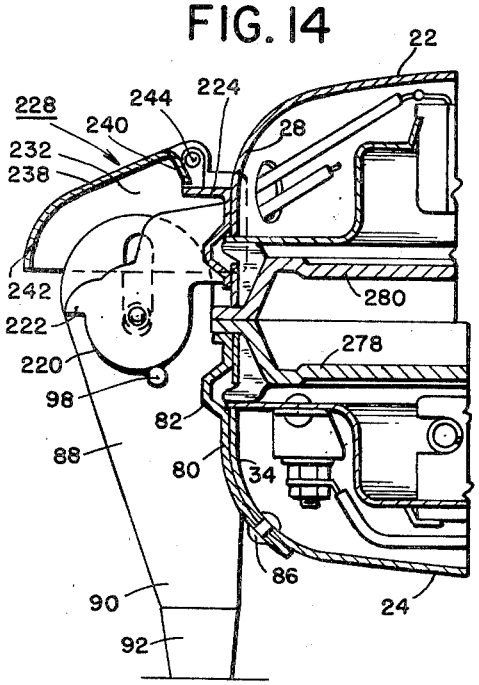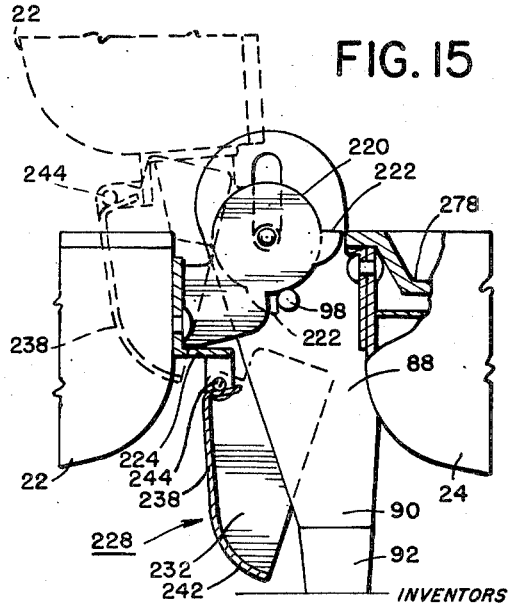
INVENTORS
ARTHUR V. RAND
WILLIAM G. ROLL
BY William C. Babcock ATTORNEY United States Patent Office 2,784,663
Patented Mar. 12, 1957

2,784,663

ELECTRIC COOKING APPLIANCE

Arthur V. Rand, Minneapolis, and William G. Roll, St. Paul, Minn., assignors, by mesne assignments, to Illinois McGraw Electric Co., a corporation of Illinois Application July 5, 1952, Serial No. 297,262

13 Claims. (Cl. 99—376)

The present invention relates to electric cooking appliances and more particularly to improvements in the construction of cooking appliances of the opposed mold or grid type such as waffle irons and sandwich grills.

Cooking appliances are well known in which two casing members are provided with electrical heating elements and suitable cooking plates and are hinged together for movement between closed and opened positions. In some of these devices the particular cooking plates, such as waffle grids, may be removed and replaced by another type of cooking surface, such as flat grill plates. The present invention is illustrated in connection with a cooking appliance of this type, and while certain features of the invention are related to the use of removable or interchangeable cooking plates, other features are capable of use in cooking appliances wherein the plates are permanently fixed in position.

One object of the present invention is an improved electric cooking appliance in which the heating element supporting tray is mounted in the appliance casing in a novel and efficient manner.

Another object is a cooking appliance having improved latching means for retaining a removable cooking plate in position on the appliance casing.

Other objects and advantages of the present invention will be apparent from the following description, in which certain preferred embodiments of the invention are disclosed. In the drawings which form a part of this application, Figure 1 is a side elevation of a cooking appliance according to the present invention, certain portions being broken away and other portions shown in section for clearness.

Fig. 2 is a partial exploded view of the lower casing and heating element supporting tray prior to assembly.

Fig. 3 is a partial perspective view of the forward portion of the lower heating element tray in inverted position.

Fig. 4 is an exploded view showing details of the latch for the removable cooking plate.

Fig. 5 is a partial view taken from the rear, of the removable waffle grid showing a portion of the retaining or latching means according to the invention.

Fig. 6 is a partial front view of the appliance, showing the relative size and location of the upper handle, control panel and latch fingerpieces.

Fig. 7 is a partial sectional view similar to Fig. 1 showing details in the retaining means for the rear edge of the element tray and cooking plate.

Fig. 8 is a partial sectional view on the line 8—8 of Fig. 7.

Fig. 9 is a partial perspective view, with certain portions broken away and others shown in section, of the retaining means for the front portion of the element tray and control panel.

Fig. 10 is a partial perspective view of the front wall of the casing in the region corresponding to Fig. 9.

Fig. 11 is a perspective view of the bracket and panel assembly for connection to the front casing wall.

Fig. 12 is a sectional view on the line 12—12 of Fig. 11.

Fig. 13 is an exploded view showing elements of the hinge assembly of the device.

Fig. 14 is a partial side view similar to Fig. 1, with portions shown in section and other portions broken away, showing an alternate form of cooking plate according to the invention, the hinge assembly being in closed position.

Fig. 15 is a view similar to Fig. 14 showing a plurality of open positions of the hinge assembly and casing.

Fig. 16 is a partial sectional view on the line 16—16 of Fig. 1, and

Fig. 17 is an exploded view showing details of the insulator of Fig. 16.

As shown in Fig. 1, the cooking appliance according to the present invention includes upper and lower body portions or casings 22 and 24, respectively. The upper body portion 22 includes a front wall 26, back wall 28, and side walls 30 providing a substantially open-mouthed casing, having its open mouth facing downwardly. Similarly the lower body portion 24 includes a front wall 32, a rear wall 34, and side walls 36 which provide a pan-shaped casing having an open mouth facing upwardly toward the upper casing. Across the open mouth of each casing a removable cooking plate is provided. For example, an upper waffle grid 38 is removably supported across the open mouth of upper casing 22, while a lower waffle grid 40 is removably mounted on the open mouth of the lower casing 24. While these cooking plates or waffle grids 38 and 40 may have any desired configuration and may be perfectly symmetrical, the lower grid 40 has been illustrated with a peripheral upwardly projecting flange 42 which provides a neat appearance at the joint between the plates.

In order to heat the respective cooking plates 38 and 40, each casing is provided with a heating element supporting tray which carries a heating element on suitable insulating members. For example, the lower casing is provided with heating element supporting tray 44 mounted within the casing below cooking plate 40, while upper casing 22 is provided with heating element tray 45 mounted above the cooking plate 38 in the position of the parts shown in Fig. 1.

The heating element itself may be mounted on the tray in any known or desired manner. For purposes of illustration, insulators 46 have been provided on lower tray 44, such insulators being inserted upwardly through a suitable hole in the tray and provided with bottom shoulders 50 which limit such upward movement. Tabs 52 formed when the insulator opening was stamped into the tray 44 are bent beneath the base and the flange 50 of the insulator 46 to prevent its downward withdrawal. The heating element is shown at 48 and is woven back and forth and supported in suitable notches in the insulating members 46. A terminal strip 54 may be supported from a portion of the tray to provide a place for suitable terminal connections for the heating element. It will be understood that the method of supporting the heating element on the upper tray is substantially the same as that described for the lower tray and that the heating units for the respective cooking plates are connected in circuit with each other in known manner.

The manner in which the element trays are supported within the casing constitutes one of the features of the present invention and will be described in connection with the lower tray 44. It will be understood that the upper tray is similarly supported within the upper casing 22. This lower tray 44 is provided around the periphery of the heating element supporting area with an upwardly projecting rear wall 56, an upwardly projecting front wall 58, as well as corresponding side walls. These vertical wall portions are useful in connection with certain features of the latching mechanism to be described and also serve to strengthen the construction.

At the top of the vertical walls 56 and 58, the tray 44 is provided with horizontally extending edges or flanges 60 and 62. Flange 60 is illustrated as projecting toward the rear wall 34 of the lower casing 24, while flange 62 projects toward the front wall 32 of casing 24. Thus these flanges or edges 60 and 62 of the element tray 44 are designed to engage the inner sides of the casing walls and thus serve to locate the element tray and prevent relative horizontal movement thereof within the casing 24.

To support the rear edge 60 of the tray at the desired vertical level within casing 24, the tray edge 60 is provided with projecting tongues 66 for engagement in suitable slots 70 in the rear wall 34 of casing 24. As shown particularly in Fig. 8, slot 70 has a lower portion 72, the width of which is just sufficient to accommodate the corresponding tongue 66 of rear edge 60 of element tray 44. Similarly, the depth of this lower portion of the slot is also just sufficient to accommodate the vertical thickness of tongue 66.

In this connection the portion of slot 70 just above the tongue 66 is narrower than the lower portion of the slot. This upper portion, as shown at 74, thus provides a downwardly facing shoulder 76 which engages the upper surface of tongue 66 and prevents undesired upward movement of tongue 66 and element tray 44. The bottom of the slot 70, of course, limits downward movement of the tongue and tray. The casing wall 34 is unbroken across the top of the slot as shown at 78, so that this upper portion of the slot may also serve as part of the retaining means for the removable cooking plate as described below. In the particular slot configuration shown in Fig. 8, it may be considered that the slot is in the shape of an inverted T, with the tongue 66 of the heating element tray 44 positioned and retained against undesired movement through engagement with the wider head portion of the T.

As illustrated in Fig. 7, a plate or bracket 80 is mounted on the outer surface of the rear casing wall 34 and extends across the area of the slot openings 70. At the area where the plate or bracket portion 80 lies directly across slot 70, this plate is deformed outwardly as shown at 82, thus providing an area or chamber 84 between the deformed portion 82 of plate 80 and the rear casing wall 34. This outwardly deformed area 84 thus receives the ends of the tongues 66 on the rear edge 60 of the element tray, so that such tongues may project a reasonable distance through the slot 70. By virtue of this construction the tongue 66 may be long enough to insure interlocking engagement with slot 70, while at the same time the end of the tongue 66 and the slot 70 are suitably concealed and protected, so that they will neither be visible from the rear nor will offer a projection on which materials could be caught and torn.

The present invention contemplates the additional provision of hinge and/or supporting leg portions on this bracket member 80. The bracket portion 80 is shaped to fit closely against the outer wall of the casing and may be riveted thereto as shown at 86 (Fig. 1). At each end of the bracket or plate portion 80 is provided an integral outwardly projecting vertical flange 88. Details of these flanges are described below in connection with the hinge assembly of the appliance, but it may be noted that the lower portion 90 of flange 88 is provided with insulated supporting feet 92 which space the plate 80 and attached lower casing 24 a predetermined distance above any supporting surface on which the appliance is placed. Flange 88 may also project upwardly to provide a hinge portion at 94 in which a vertical slot 96 or other hinge connection is provided. For the particular type of hinge illustrated and described in detail below, a stop pin 98 is also provided on flange 88 somewhat below and inwardly of the slot 96. Thus the central plate portion 80 of the hinge and supporting leg bracket not only joins the flanges 88 at each end thereof and provides a firm attachment for the hinge and supporting leg assembly to the casing, but also provides the deformed area 82 described above which receives the ends of the element tray tongues and conceals and protects them.

The opposite or front edge 62 of the heating element tray 44 is also supported and retained against vertical movement in a new and improved manner according to the present invention. This attachment is particularly illustrated in Figs. 9 through 12. Here the front casing wall 32 is cut away as shown at 100 to accommodate part of the latch mechanism described below. This cut away portion may also include a circular notch 102 to accommodate the shaft 104 (Fig. 1) of a suitable control thermostat 106. This thermostat 106 is mounted in known manner in such a way that it has a heat-conductive portion 108 at its top in close thermal relationship with the under surface of the cooking plate 40. Thus the thermostat is closely responsive to the temperature of the cooking plate and is connected in circuit with the heating element to control the energization of the latter and maintain the desired cooking plate temperature. A control knob 110 at the outer end of the shaft 104 permits manual adjustment of this cooking temperature.

With reference to Fig. 10, again, the front casing wall 32 is provided with substantially vertical slots 112 and 114 at each side of the cut-away section 100. These slots are located to provide slot portions both above and below the desired level for the element tray edge 62. A bracket member 116 is designed to be mounted on the outside of this casing wall 32 through cooperation with these slots.

Thus bracket 116 has inwardly projecting flanges 118 and 120 extending vertically at each edge thereof. The inner edge of each flange 118 and 120 is shaped to fit against the front wall 32 of the lower casing and maintain the flat central area of the bracket 116 spaced slightly outwardly from the casing wall. This spacing permits circulation of air and assists in keeping the bracket 116 cool. It also provides working space for the latch.

Each of the flanges 118 and 120 has a pair of vertically spaced tabs designed for insertion in the slots 112 and 114 of the front casing wall 32. Thus flange 118 has a lower tab 122 and an upper tab 124, while flange 120 has lower and upper tabs 126 and 128, respectively. The vertical spacing between these tabs is just sufficient to receive the edge 62 of the element tray 44 and prevent undesired upward or downward movement of the tray at this edge of the casing. Thus, as shown in Fig. 9, the lower tabs 122 and 126 engage the undersurface of the edge 62 of the element tray, while the upper tabs 124 and 128 engage the upper surface of the tray. Since the slots prevent vertical movement of the tabs, and the tabs in turn engage the tray, vertical movement of the tray in either direction at the front of the casing is thus prevented.

In order to retain the bracket 116 in assembled position against the casing wall 32, at least one of the tab portions is deformed inside the casing wall 32 as illustrated in connection with tabs 124 and 128. This deformation of the tabs prevents removal of the bracket 116 and tabs through the slots 112 and 114, yet at the same time leaves the tabs in engagement with the edge of the element tray for the purpose described.

While the bracket 116 may be used for various purposes, it is illustrated in connection with the lower casing as a mounting means for a front control panel. Thus the bracket 116 has a circular opening 130 through which the thermostat adjusting shaft 104 may project to the front of the casing. An insulating panel 132, which serves as a control panel and may carry suitable indicia cooperating with the thermostat adjustment knob 110, is suitably connected to the front bracket 116 by means of tabs 134 and 136 struck outwardly from the central plate portion of bracket 116, as particularly illustrated in Fig. 12. The upper edge 138 of this control panel 132 preferably lies substantially flush with the upper edge 140 of the forward casing wall 32. The upper portion of bracket 116 is also preferably cut away at 142 corresponding to the cut-away portion 100 of the front casing wall 32 to provide additional space for accommodation of the latch member described below. For this same purpose, the central portion of the control panel 132 may be recessed on its inner surface as shown at 144 near the top edge 138 of the panel.

As illustrated in Fig. 1, the method of retaining the upper element tray 45 is substantially similar to that just described. Here, however, the bracket 146 at the front wall 26 of the upper casing 22 is in the form of a spacer for the upper casing handle. This bracket 146 has side flanges 148 each of which has upper and lower tabs 150 and 152 projecting through suitable slots in the casing above and below the front edge of the element tray 45, just as in the case of the spaced tabs described in connection with the lower tray. These tabs may be deformed to hold the handle spacer or bracket 146 in position. A screw 154 is additionally provided and extends from the inside of the casing 22 up through the bracket 146 and into a plastic handle member 156. This handle has its upper portion 158 projecting upwardly above the appliance to serve as a support for the upper casing when the latter is opened 180 degrees to the heavy-line position illustrated in Fig. 15. The lower edge 160 of this handle member 156 is located at a point which will be spaced somewhat above the upper edge 138 of the control panel 132 on the lower casing. This spacing is designed to be just sufficient to accommodate the fingerpieces of the latch members described below. For convenience in appearance and design, the lower edge 160 of the upper handle 156, and the upper edge 138 of the control panel 132, as well as the intervening latch fingerpieces are preferably identical in width as shown in Fig. 6.

The opposite or rear end of the upper element tray 45 is secured in the same manner as the rear edge 60 of the lower element tray by means of tongues 162 which projects through slots 164 in the rear upper casing wall 28. The plate or bracket 166 overlies the rear casing wall throughout this area and is deformed at 168 to receive and protect the projecting tongue 162. This bracket portion 166 may constitute part of the upper hinge member as described below.

According to the present invention, a new and improved latching means is provided for the removable cooking plates. With reference to the lower waffle grid 40, at least one outwardly extending projection 170 is provided at one edge of the grid for insertion in a slot in the casing wall. As shown in Fig. 1, this shoulder 170 is preferably located at the rear edge of the cooking plate 40 and is designed for engagement in the narrower but deeper upper portion 74 of the slot 70 in the rear casing wall 34. Thus the same slot 70 which has a wide lower portion to retain the tongue of the heating element tray may also serve as the retaining means for the projection 170 on the cooking plate. Since the wall portion 34 is continuous across the top of the slot as shown at 78, this engagement of the casing wall above the slot with the upper surface of projection 170 will prevent inadvertent upward movement of the rear edge of cooking plate 40.

The latching means also includes means at the opposite edge of the cooking plate providing an outwardly and upwardly facing shoulder 174. Here the shoulder 174 is provided by a depending lug 172. This latching shoulder 174 is engaged by the latching portion 176 of a latch member shown generally at 178 (Figs. 1, 3, and 4). According to one feature of the invention, this latch member is supported by the element tray. For this purpose, the latch has inwardly and downwardly extending legs 180 provided with tabs 182 at their inner end for engagement with slots 184 in the element tray. Engagement of tongues 182 with slots 184 thus provides a pivot for the inner end of the latch member 178. This pivot is located below the latching shoulder 174 and inwardly thereof and for this purpose the slots 184 are conveniently located on the tray near the point where the front vertical wall 58 joins the lower or main tray portion. Here slots 184 are shown in the front wall itself. The latch may be secured to the bottom of the element tray near front wall 58, if preferred.

The front flange 62 of the element tray may be cut away as shown at 186 (Fig. 4) both to retain the latch member against lateral movement and to permit sufficient inward and upward movement of the latch to engage the shoulder 174 on the cooking plate 40.

To retain the latch 178 in assembled position on the tray 44, the legs 180 of the latch are provided with integral lugs or hooks 188 struck up from the material of the legs and having their open ends facing outwardly and upwardly, i. e., away from the pivot slots 184. Similar lugs or tabs 190 are struck up from the front flange 62 of the element tray, except that these lugs have their open ends facing inwardly toward the pivot slots 184. A suitable spring member 192 is then engaged in the respective lugs 188 and 190 and serves to urge the latch member inwardly against the element tray and upwardly against the latching shoulder 174. The central portion 194 of this spring 192 may be deformed slightly to maintain it in position between the legs 180, while the ends 196 of the spring 192 may be deformed to prevent endwise movement of the spring with respect to tabs 190.

Beyond the latching portion 176, the main body of latch 178 extends upwardly and outwardly through the notched portion 100 of the front casing wall 32 and the notched portion 142 of bracket 116 to a position outside the casing and adjacent the front edge of the cooking plate 40. This outer portion of the latch has a vertical section at 198 to maintain the latch close to the edge of the cooking plate, and the extreme outer portion of the latch is then formed in a horizontal fingerpiece 200. Fingerpiece 200 is wider than the remainder of the latch and is designed to be of the same width as the upper edge 138 of the control panel 132 as shown in Fig. 6. This fingerpiece includes vertical front and rear flanges 204 and 202 which give the fingerpiece a channeled shape for rigidity.

The front flange 204 also assists in concealing the space between the fingerpiece 200 and the upper edge 138 of the control panel in the latching position shown in Fig. 1.

Because of the relative location of the latching shoulder 174 and the pivot and fingerpiece of the latch itself, the fingerpiece 200 and latching portion 176 of latch 178 will move both downwardly and outwardly in response to pressure on fingerpiece 200. This downward and outward movement will move the latching portion 176 clear of the shoulder 174 to permit upward removal of the front edge of lower cooking grid 40. Once the front edge of the grid is lifted, the projection 170 at the rear of the grid can be disengaged readily from the slot 70.

The waffle grid or some other form of cooking plate such as the flat grill plate 278 of Fig. 14, can then be reapplied to the lower casing by reversing the operation. Thus the mounting of the grid will involve, first, the engagement of the rear projection 170 with the upper portion of slot 70. The front of the plate will then be pushed downwardly and by virtue of the curved surfaces on the latching portion 176 and shoulder 174, the shoulder will snap past the latch until spring 192 brings the latching portion in above the shoulder and retains the plate in position.

The particular location of fingerpiece 200, and the direction of movement of the fingerpiece 200 downwardly and outwardly toward the upper edge 138 of the control panel provides a latching mechanism which is inconspicuous and yet which is easily released by simple downward pressure. Should more force be desired or needed to release the latch, the fingerpiece 200 can be depressed with the thumb, while one or more of the remaining fingers is engaged beneath the control knob 110 or control panel 132 to provide the necessary leverage for a squeezing or pinching action.

The latching and retaining means for the upper cooking plate is substantially similar in construction. Thus the upper grid 38 has at its rear edge a rearwardly extending projection 206 for engagement in the slot 164 in rear casing wall 28. At the front edge of the upper grid 38 a forwardly facing latching shoulder 208 is provided. This latching shoulder is engaged by the latching portion of an upper latch member 210 mounted on upper element tray 45 and having a fingerpiece 212 located just below the lower edge 160 of the upper casing handle 156.

The forward edge of fingerpiece 212 has an upwardly directed flange 214 which both strengthens the fingerpiece and also assists in concealing the space between the fingerpiece 212 and the lower edge 160 of the handle. Fingerpiece 212 is the same in width as fingerpiece 200, so that a clean-cut and uniform appearance is provided by the similar widths of the lower handle edge 160, fingerpiece 212, fingerpiece 200, and upper control panel edge 138. The upper latch member 210 is pivoted to the upper element tray 45 at a point which is located above and inwardly of the retaining shoulder 208. Thus the construction corresponds exactly to that of the latching means for the lower cooking plate, except that the parts are inverted in the position of Fig. 1.

Location of the upper latch fingerpiece 212 just below the lower edge 160 of the upper handle 156 likewise contributes to ease of operation in removing and inserting the cooking plate. Not only is the latch inconspicuous, but just as in the case of the lower latch, the desired pressure can be exerted by forcing the fingerpiece 212 toward the handle with the thumb or one finger, while one or more other fingers is engaged with the upper or opposite end of the handle. Insertion and removal of this upper cooking plate 38 will ordinarily take place, of course, when the upper casing is moved to its completely open position as shown by the heavy line position of Fig. 15.

The improved hinge assembly which permits movement of the upper and lower casings from the relatively closed position of Fig. 1 (in which the cooking plates are in face-to-face position opposite each other and the casings are relatively superimposed) to an open position (in which the plates are spaced from each other) has already been partially described. The hinge details are further shown in Figs. 13, 14, and 15.

As already described, the hinge assembly includes a lower hinge member having a central bracket or plate portion 80 shaped to fit against the lower casing rear wall 34 and riveted thereto or otherwise attached as shown at 86. This bracket portion has the outwardly deformed area 82 opposite the retaining slots in the casing wall as described.

At each end of the bracket portion 80 is an outwardly projecting flange 88. These flanges 88 are in planes substantially parallel to each other and perpendicular to the general plane of bracket portion 80, although it will be understood that bracket portion 80 may be somewhat curved to fit the corresponding casing wall. The lower portion 90 of each flange 88 may carry an insulating or supporting foot 92, while the upper portion of each flange 88 constitutes a hinge portion and is provided with means for pivotally supporting an upper bracket member and upper casing. While this pivot means may take various forms, it is illustrated as a slot 96 extending substantially vertically, in combination with a stop pin 98 projecting inwardly on each flange.

The upper hinge unit includes the central bracket portion 166 previously described. This central bracket portion has the deformed areas 168 similar to portions 82 of the lower bracket. The upper bracket is shaped to conform substantially to the outside of the upper casing rear wall 28 and is secured thereto by rivets or other means (not shown). At each end of the bracket portion 166 is an outwardly projecting flange 216. These flanges also lie in planes parallel to each other and generally perpendicular to the over-all plane of the central bracket portion 166. Furthermore, these flanges 216 are designed to lie immediately adjacent, and in this case just inside the two flanges 88 of the lower hinge member.

Flanges 216 are provided with outwardly projecting pins 218 for engagement in the vertical slots 96 of the hinge portion 94 of the lower bracket. These bracket portions 216 also have a lower circular edge 220, the center of the circular edge being at the center of pins 218. The distance of this circular edge 220 from its axis 218 is just sufficient so that the circular edge 220 lies adjacent the stop pin 98 as shown in Fig. 14 when the pivot pins 218 are at the bottom of slots 96.

At the outer edge of each bracket 216 is a projection or stop 222 designed for engagement with the stop pin 98 to limit rotation of the hinge members and define one of the open positions of the upper casing. The relative location of the pin 98 and stop 222 is such that the upper casing may be opened from the relatively closed position of Fig. 1 to the dotted line position of Fig. 15 in which the upper casing is swung just past the vertical or 90-degree position with respect to the lower casing. At this point the weight of the upper casing and assembled units is in back of the pivot pins 218 of the hinge assembly so that the upper casing would tend to fall outwardly farther away from the lower casing except for engagement of the stop 222 against pin 98.

When it is desired to open the upper casing still further and place it at substantially 180 degrees with respect to the lower casing, so that both casings provide upwardly facing cooking surfaces, the upper casing may be lifted so that the stop 222 is raised out of engagement with stop pin 98, and the upper hinge bracket and associated casing can then be rotated to the heavy-line position of Fig. 15.

In order to substantially conceal and protect the hinge parts in their various positions and to provide a neat finished appearance for the appliance, a suitable cover member for the hinge assembly is also provided. To support the cover member and to reinforce the upper hinge bracket 166, this bracket is provided with a horizontally and outwardly facing upper flange 224. At each end of this flange is an upturned tab or lug 226 provided with an opening for a hinge pin.

The cover itself is shown at 228 and includes parallel side flanges 230 and 232 integrally joined to an intermediate main cover portion 238. The side flanges 230 and 232 have hinge tabs or lugs 234 and 236 which are also perforated to receive a hinge pin. The intermediate portion of cover 228 has a downwardly and inwardly inclined flange 240 designed to extend toward the horizontal top flange 224 of the upper hinge bracket and thus avoid any substantial gap along the hinge axis of the cover. Similarly, the rear edge of the cover extends rearwardly and downwardly so that the lower portion 242 thereof is almost vertical and is located in rear of and only slightly above the main hinge axis.

Hinge pins 244 connect the cover 228 to the upper bracket and permit the cover to swing relatively in a clockwise direction with respect to the remaining portion of the upper casing as the upper casing itself moves from the fully closed to the 90-degree and 180-degree positions of Fig. 15. Without this swinging mounting of the cover, it would be difficult to provide a hinge assembly in which the hinge parts would be substantially concealed and protected in the closed position of the casings, without at the same time preventing movement of the upper casing to the full 180-degree position shown in heavy lines in Fig. 15. The inner ends of side flanges 230 and 232 engage the rear upper casing wall to hold the cover in the horizontally projecting position of Fig. 14 when the casings are in closed position.

The present hinge assembly has the further advantage that the lower hinge bracket serves as a supporting means for both the lower casing and the upper casing, since the upper hinge bracket is hinged to it and is thereby supported directly from flanges 88 and legs 92. In this way, the weight of the upper casing in its 90-degree and 180-degree positions is taken substantially by the lower hinge bracket which may be made of relatively thick and strong stock, rather than by the walls of the lower casing which may desirably be made of thinner stock.

A signal light arrangement is provided to show the operating condition of the device. As illustrated in Figs. 16 and 17, the upper casing 22 is provided with a signal light opening 246. Mounted in this opening is a suitable signal light lens member 248 having a reduced portion 250 extending down through the opening and shouldered at its lower end to engage a snap-retaining ring 252 on the inner side of the casing wall. Directly beneath the signal light opening in the casing 22 is a corresponding opening 254 in the upper element tray 45. An insulator is mounted in this opening and part of the upper heating element is threaded up over the insulator so as to be visible through lens 248.

In the specific example shown, integral tabs are struck downwardly from the tray as shown at 256 for engagement in notches 258 in insulating members 260. The complete insulating member is made in two identical halves having surfaces 262, 264, and 266 in a common central plane for engagement with each other. One or more vertical passages 268 and 270 are provided, half of the passage being located in each insulator. The lower ends of the passages may be rounded as shown at 272 and 274.

The heating element 49 for the upper casing is supported on depending insulators 46 carried by element tray 45, these insulators being identical to those previously described in connection with the lower casing. A portion of this upper heating element wire 49 is looped upwardly through one passage 268 and back down through the adjacent passage 270 of insulating members 260. Thus a bight 276 of the upper heating element wire 49 lies above the element tray 45 directly beneath the signal light opening in upper casing 22. When the heating element is energized, it will act as a direct signal which can be observed through the lens 248 to indicate the operating condition of the appliance. Thus a particularly economical and advantageous construction has been provided for utilizing the heating element wire as an operating signal for the device.

The construction described above substantially accomplishes the objects set forth at the beginning of this application and offers definite advantages in economy and simplification of construction, as well as ease of operation. Since minor variations and changes in the exact details of construction will be apparent to persons skilled in this field, it is intended that this invention shall cover all such changes and modifications as fall within the spirit and scope of the attached claims.

Now, therefore, we claim:

1. An electric cooking appliance having a body portion with front, rear and side walls defining an open-topped casing, a removable cooking plate mounted across said open-topped casing, a heating element supporting tray mounted in the casing below the plate, and latching means for removably securing one edge of said plate against the casing, said latching means including an outwardly projecting upwardly facing shoulder on the plate, and a latch pivoted to the element tray below the plate, said latch having a latching portion engaging above the shoulder and a fingerpiece extending outwardly of one wall of the casing adjacent the plate.

2. An electric cooking appliance according to claim 1 in which the latch is completely supported by the element tray, said tray and latch constituting a separate subassembly which is mounted in the appliance as a single unit.

3. An electric cooking appliance according to claim 1 in which the latch is pivoted to the tray at a point located inwardly of and below the shoulder, said latch extending upwardly and outwardly from the pivot to the fingerpiece, thereby unlatching the shoulder and plate in response to movement of the fingerpiece in a direction having substantial downward and outward components.

4. An electric cooking appliance having a body portion with front, rear and side walls defining an open-mouthed casing, a removable cooking plate mounted across the open mouth of the casing, a heating element supporting tray mounted in the casing below the plate, said tray having a substantially vertical wall at one edge extending upwardly toward the plate and spaced inwardly of the casing wall, and a horizontal outwardly projecting flange at the top of the tray wall extending to the corresponding casing wall and locating the tray with respect thereto, and latching means for removably securing one edge of said plate against said corresponding casing wall, said latching means consisting of an outwardly projecting shoulder on the underside of the plate and located above said tray flange inside the casing, and a latch pivoted to the tray close to the bottom of said vertical tray wall, said latch extending upwardly and outwardly past the outer edge of the flange and having a retaining portion projecting inwardly above the flange and removably engaging said plate shoulder and also having a fingerpiece extending outwardly of the casing adjacent the edge of the plate, the latch being resiliently urged upwardly and inwardly toward the tray flange and plate shoulder.

5. A cooking appliance according to claim 4 in which said vertical tray wall has a slot therein and the latch has at its inner end a tongue engaging the slot and providing a pivotal bearing for the latch, and a spring member connected between the tray and latch and resiliently urging the latch in a direction maintaining said tongue in said slot as well as resiliently urging the latch into retaining engagement with said plate shoulder.

6. A cooking utensil according to claim 5 in which the latch has an outwardly facing hook and the tray flange has an inwardly facing hook at each side of the latch, the spring member consisting of a resilient wire engaged at its ends by said flange hooks and at its center by said latch hook.

7. An electric cooking appliance comprising a body portion having upwardly projecting peripheral front, rear and side walls defining an open-mouthed casing, a cooking plate removably mounted on said casing, a heating element supporting tray located in the casing below said plate and having a laterally projecting tongue, one wall of said casing having a retaining slot into which the tongue projects, the lower portion of the slot having a width and depth to receive said tongue and the slot having a narrow upper portion above the tongue providing a retaining shoulder preventing upward movement of the tongue, a retaining projection on the bottom of said cooking plate at one edge thereof located for insertion in a portion of the slot above said tongue when the cooking plate is in position on the casing, the casing wall above said slot engaging the top of the projection and preventing the undesired upward movement of said projection and cooking plate edge away from said one casing wall while said projection is in the slot, and means removably latching another portion of the plate against the casing, thereby preventing undesired swinging movement of the plate away from the casing to disengage the projection and slot.

8. An electric cooking appliance according to claim 7 in which said slot is of inverted T-shape, with the element tray tongue fitting the head of the T, and with the cooking plate projection fitting the leg of the T.

9. A cooking appliance according to claim 7 in which said slot is in the rear wall of the casing and the means removably latching the plate is at the front of the device.

10. A cooking appliance according to claim 7 in which said slot is in the rear wall of the casing and in which the front wall has vertical slot portions above and below the element tray and a bracket member mounted outside the front wall and having vertically spaced tabs extending through the front wall slot portions and engaging the top and bottom of the tray to prevent vertical movement thereof.

11. A cooking appliance according to claim 10 in which one of said tabs is deformed within the casing thereby preventing outward movement of the bracket away from the front casing wall.

12. An electric cooking appliance having a body portion with front, rear and side walls defining an open-mouthed casing, a cooking plate mounted across the open mouth of the casing, a heating element supporting tray mounted in the casing below the plate, said tray having at least one edge extending toward one corresponding wall of the casing and locating the tray with respect to said wall, said wall having a slot extending both above and below the desired level of said tray edge, and an external bracket member on the casing having a pair of vertically-spaced tabs passing through the slot with the lower tab engaging the underside of the tray edge and preventing downward movement thereof and with the upper tab engaging the upper side of the tray edge and preventing upward removal thereof, at least one of said tabs being deformed inside the casing wall and thereby preventing outward removal of the bracket and tabs from the casing and slot in addition to its function in preventing vertical movement of the tray edge in one direction.

13. An electric cooking appliance according to claim 12 having a handle member for the casing, said handle member being secured to the bracket.

References Cited in the file of this patent

UNITED STATES PATENTS

| | | |
|---|---|---|
| 1,587,788 | Morley | June 8, 1926 |
| 1,705,727 | Forshee | Mar. 19, 1929 |
| 1,798,648 | Armstrong | Mar. 31, 1931 |
| 1,982,410 | Atkinson | Nov. 27, 1934 |
| 2,015,812 | Nelson | Oct. 1, 1935 |
| 2,070,706 | Benson | Feb. 16, 1937 |
| 2,150,247 | Rodwick | Mar. 14, 1939 |
| 2,361,285 | Gough | Oct. 24, 1944 |
| 2,496,705 | Farr et al. | Feb. 7, 1950 |
| 2,571,216 | Davis | Oct. 16, 1951 |